Nov. 18, 1930.  B. S. ROBINOFF ET AL  1,782,316
METHOD OF WELDING
Filed May 10, 1929
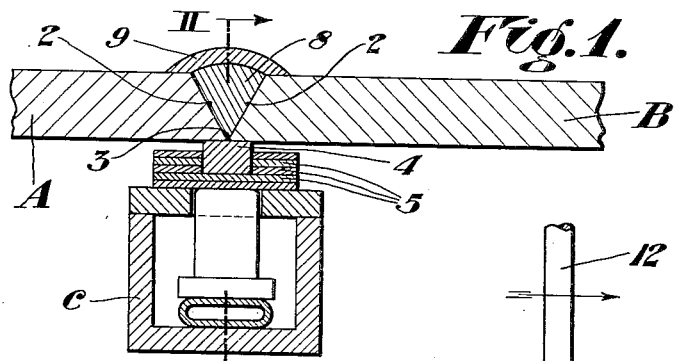
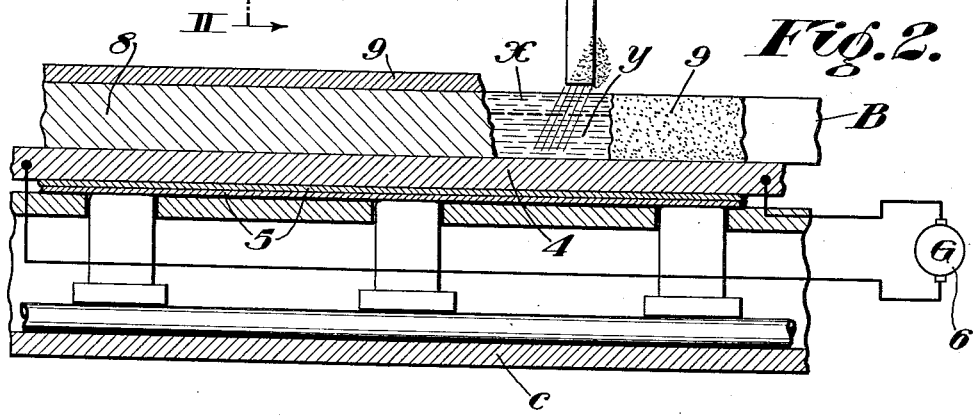
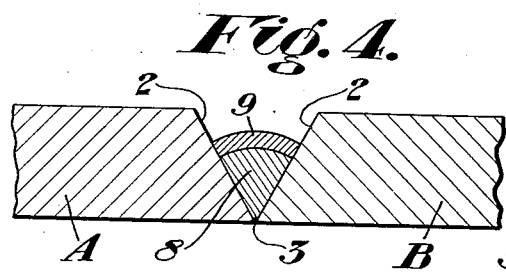
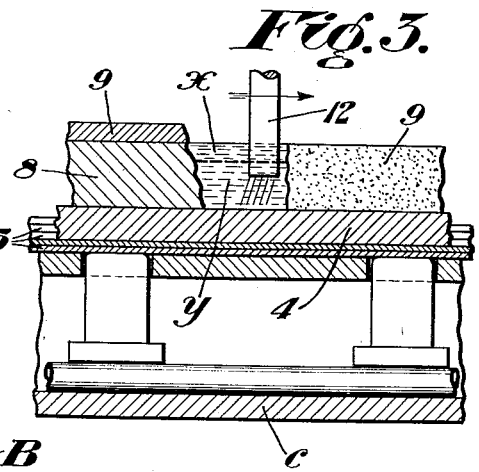
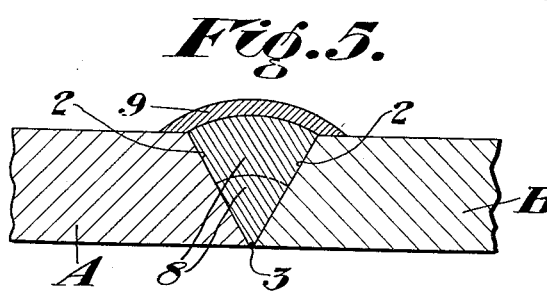
Inventors:
BORIS S. ROBINOFF, SUMNER E. PAINE
and WRIGNOL E. QUILLEN.
by Usina & Rauber
their Attorneys.

Patented Nov. 18, 1930

1,782,316

UNITED STATES PATENT OFFICE

BORIS S. ROBINOFF, OF PITTSBURGH, AND SUMNER E. PAINE AND WRIGNOL E. QUILLEN, OF McKEESPORT, PENNSYLVANIA, ASSIGNORS TO NATIONAL TUBE COMPANY, A CORPORATION OF NEW JERSEY

METHOD OF WELDING

Application filed May 10, 1929. Serial No. 362,040.

This invention relates to methods of welding and while not limited thereto relates particularly to a method of forming continuous seam welding, such as when forming large cylindrical articles like pipe, tanks, etc.

One of the objects of the present invention is to provide a novel method by which the metal deposited during the welding operation is prevented from oxidizing by maintaining a heavy covering or layer of flux or slag on the molten metal. This cover of slag or flux also serves to maintain the deposited metal molten for sufficient time to permit all gases to escape from the molten metal whereby a non-porous depositing of molten metal results.

Another object is to provide a method by which continuous weld rods of any length may be used thereby permitting a continuous weld of any length.

Heretofore weld rods have generally been coated with a flux material and such rods cannot be reeled since reeling will break off the flux; therefore, the length of such rods and consequently the length of the continuous welds is limited.

A further object is to provide a method whereby the flux is caused to be attracted and adhere to the electrode by magnetic forces as the electrode is fed toward the point of weld.

In carrying out our method the edges of the plate or plates to be welded are first chamfered and then brought into an abutting position to form a U or V-shaped groove along the line of weld. The plate or plates are then positioned over a suitable backing up bar standard welding apparatus and clamped in their abutted position. The groove is then filled with a powdered flux composition having a percentage of ground or powdered scale (ferrous oxide) to make the flux magnetizable.

After the groove has been filled with flux the welding head of the welding machine, having a reel of welding rod or electrode wire thereon, is started in operation to feed the electrode down into welding position with respect to the flux filled groove and also to feed the electrode longitudinally of the groove. After the electrode is brought into proper position an arc will be struck so as to melt the flux in the groove and also to melt the metal of the electrode so as to furnish a deposit of metal in the groove.

As the welding operation progresses the welding rod will be continually melted and deposit the molten metal through the molten flux in the groove, and the metal being of greater specific gravity than the molten flux will cause the flux to rise in the groove as the metal is deposited. The movement of the welding head is so timed that the proper amount of molten metal will be deposited to fill the groove the desired amount as the head pases along the groove.

In carrying out this method the molten metal deposited from the electrode is at all times covered by a layer of the flux in the form of a slag and therefore the deposited metal from the electrode will remain molten a sufficient time to permit any entraining gases to escape and the deposited metal will not become oxidized since the flux or slag protects the molten metal from the atmosphere.

In the drawings:

Figure 1 shows the edges of a pair of plates with a finished weld joining them and with the flux or slag covering the welded joint.

Figure 2 is a longitudinal section through a joint being welded by the preferred method of this application.

Figure 3 is a similar view to Figure 2 showing a slightly modified method for carrying out our invention.

Figure 4 is a sectional view showing a pair of heavy plates which have been partly joined by the methods of this application.

Figure 5 is a view similar to Figure 4 showing the same plates as shown in Figure 4 with the welded joint completed.

Referring more particularly to the drawings which illustrate generally the method of and apparatus for carrying out our invention, the letters A and B designate the workpieces to be joined which may be separate plates or the opposite edges of a tubular object such as a pipe, tank, etc., formed from a single plate.

The edges of the work to be joined or seamed are chamfered or beveled as at 2 and are forced together so as to form a V-shaped groove 3. After the work is thus prepared it is mounted on a welding beam c of a welding machine having a backing up bar 4 of copper and around which are mounted iron plates 5. The bar 4 is connected to a source of current such as the generator 6 and the current passing through the bar 4 serves to magnetize the plates 5 and form a magnetic field along the line of weld.

The V-shaped groove is then filled with a flux 9 having a ferrous metal scale content sufficient to make it magnetic, and the joint or seam is then in readiness for welding.

The operation of welding from this point may be carried out in several ways all of which retain the one fundamental feature of maintaining a relatively heavy coating of flux or slag 9 on top of the molten welding metal and through which the molten metal is deposited so as to prevent oxidation of the metal.

In Figure 1 a completed seam weld is shown in which the deposited metal 8 is shown covered by the layer of flux or slag 9.

In Figure 2 the section is taken through the weld and shows the welding method of this invention in operation. At the left hand of this figure the weld is shown completed, while at the center the weld is being made and at the right-hand end the groove 3 is shown filled with flux.

After the groove 3 is filled with flux, the metal electrode 12, which is preferably plain uncoated rod mounted on a reel carried by the welding head (not shown), is moved into position to strike an arc with the side-walls and bottom of the groove 3. When the arc is thus struck the welding current will flow from a suitable source through the rod and work and the rod will become magnetized so as to attract the flux 9. The flux thus attracted will be melted by the arc and form a molten slag in the groove 3. The electrode is then continually fed down toward the work and forwardly along the groove 3 at a speed timed so as to deposit the required amount of welding metal in the groove 3 and also so that the flux is always spaced in advance of the electrode. The flux will be continually attracted by the electrode 12 and will be melted so as to maintain a body of molten flux $x$ in said groove below the electrode through which the molten welding metal is deposited forming a pool $y$. The body of flux in advance of the electrode serves as a dam and thereby permits the building up of the molten welding metal and flux or slag. As the welding operation progresses the deposited metal and its covering of slag solidifies, but said slag will maintain said metal molten until all gases have escaped and also said slag will prevent any oxidation of the deposited metal.

The magnetic field formed along the line of weld serves to control the arc and the deposit of molten metal so that the metal is deposited to the rear of the arc rather than in advance of the arc as would otherwise be the case. It also probably serves to magnetize or pre-charge the magnetizable flux so that said flux is more readily attracted by the electrode.

In Figure 3 a modified method of this invention is disclosed. In this modified method the electrode 12 is caused to move down into the body of flux 9 and is then moved forward at a speed to maintain the electrode in close position relative to the flux thereby causing said flux to be melted directly by the arc.

When welding the thinner gages of work the groove 3 will be completely filled as shown in Figure 1 in one operation, however, when welding heavy gage work the method illustrated in either Figures 2 or 3 will be preferably used to partly fill the groove 3 as shown in Figure 4, and the flux or slag covering is then removed by power chisels or the like and the remaining portion of the groove will then be again filled with flux and a second welding operation will be used to completely fill the groove 3 as shown in Figure 5.

In the practice of either modification of the above method a continuous electrode is used so that the welding operation may be carried on continuously as contrasted to the interrupted operations necessary when using the relatively short coated electrodes of the prior art. This feature alone results in a superior weld over the welds of the prior art with their many joints caused by the successive use of the relatively short electrodes.

Furthermore the practice of either modification of the method of this invention eliminates the oxidation of the deposited metal, while the coated electrodes of the prior art do not provide a continuous body of molten flux to protect the molten metal and maintain said metal molten until the gases escape therefrom.

While we have described and illustrated certain specific embodiments of our invention it will be understood that we do not wish to be limited to the specific steps or sequence of steps described since various modifications may be carried out without departing from the scope of our invention as described in the appended claims.

We claim—

1. In a method of seam welding the steps of first forming a groove along the seam to be welded, filling said groove with flux, causing said flux to become molten, and depositing the welding metal through said molten flux so as to cause said flux to rise over and form a layer on said metal.

2. The method of forming continuous seam welding, which consists in providing a body of magnetizable flux along the seam to be welded, moving a metal electrode along said seam so as to draw an arc and melt said electrode and cause the molten metal from said electrode to deposit along said seam, and causing said flux to be attracted to said electrode during said welding operation by magnetic forces, said flux being melted by the welding arc to form a slag covering over the molten metal.

3. In a method of seam welding these steps of first forming a groove along the seam to be welded, filling said groove with a magnetizable flux, then moving a metal electrode along said seam so as to draw an arc and melt said electrode, and causing said flux to be attracted to said electrode by magnetic forces, said flux being melted by said arc so as to form a covering of flux over the molten metal deposited from said electrode.

4. In a method of welding, the steps of providing a magnetic field along the line of weld, providing a body of magnetizable flux within said field, and then moving a metal electrode along said line of weld so as to draw an arc and with sufficiently close proximity to said flux that said flux will be attracted to said electrode so as to continually coat said electrode with flux.

5. The method of forming continuous seam welds which consists in providing a controllable magnetic field along the seam to be welded, providing a body of magnetizable flux within said magnetic field, moving a metal electrode along said seam so as to draw an arc and melt the said electrode, and causing the melted metal from said electrode to deposit along said seam, said flux being attracted to said electrode and being melted by said arc so as to form a covering of flux over the molten metal deposited from said electrode.

6. The method of forming continuous seam welds which consists in providing a controllable magnetic field along the seam to be welded, providing a body of magnetizable flux within said magnetic field, moving a metal electrode along said seam so as to draw an arc and melt the said electrode, and causing the melted metal from said electrode to deposit along said seam, controlling the movement of said electrode so that said electrode will be constantly spaced a short distance from said body of flux, said flux being attracted to said electrode and being melted by said arc so as to form a covering of flux over the molten metal deposited from said electrode.

7. The method of forming continuous seam welds which consists in forming a groove along the seam to be welded, providing a controllable magnetic field along said seam, depositing a quantity of magnetizable flux in said groove, moving a metal electrode along said seam toward said flux so as to draw an arc and melt said electrode, and causing the melted metal from said electrode to deposit in said groove, said flux being attracted to said electrode and being melted by said arc so as to form a covering of flux over the molten metal deposited from said electrode.

8. In a method of seam welding the steps of first forming a groove along the seam to be welded, then depositing a body of flux in said groove, and then moving a metal electrode along said groove and drawing an arc causing said flux to melt and melting said electrode so as to deposit the molten metal from said electrode through said melted flux.

In testimony whereof, we have hereunto set our hands.

BORIS S. ROBINOFF.
SUMNER E. PAINE.
WRIGNOL E. QUILLEN.